United States Patent Office

3,729,381
Patented Apr. 24, 1973

3,729,381
PROCESS FOR PRODUCING L-METHIONINE
Kiyoshi Nakayama, Sagamihara, and Kazumi Araki, Tokyo, Japan, assignors to Kyowa Hakko Kogyo Co., Ltd., Tokyo, Japan
No Drawing. Filed Jan. 25, 1971, Ser. No. 109,609
Claims priority, application Japan, Feb. 6, 1970, 45/10,005
Int. Cl. C12d 13/06
U.S. Cl. 195—96         5 Claims

ABSTRACT OF THE DISCLOSURE

L-methionine is produced by fermentation of an aqueous nutrient medium with an L-methionine-producing certain type mutant strain of coryneform glutamic acid-producing bacteria.

BACKGROUND OF THE INVENTION

The present invention relates to a process for producing L-methionine by fermentation, characterized by culturing in a nutrient medium an L-methionine-producing certain type mutant strain of coryneform glutamic acid-producing bacteria represented by *Corynebacterium glutamicum*, accumulating L-methionine in the culture liquor and recovering L-methionine therefrom.

L-methionine is a sulfur-containing amino acid which is essential in the nutrition of animals, especially cattle and is often used as a feed additive. Additionally, it has other known uses. For example, it is useful as a lipotropic agent and for the treatment of liver disease in animals. Therefore, the establishment of a relatively inexpensive, industrial process for the production thereof has been intensively sought.

Heretofore, only limited methods have been available for the production of L-methionine. For example, there is a process for the production of L-methionine by optically resolving DL-methionine prepared by a synthetic method. It is also known to produce L-methionine by hydrolyzing proteins. Additionally, it is known to produce L-methionine by a microbiological process such as by culturing a microorganism belonging to the genera Microbacterium and Streptomyces in a hydrocarbon medium (U.S. Pat. No. 3,219,543). Similarly, Japanese patent publication No. 19,150/64 discloses a process for producing L-methionine wherein γ-methylmercapto-α-hydroxybutyric acid, an intermediate product of the aforementioned synthetic process, is converted to L-methionine by a microorganism. However, these latter two methods have not proved satisfactory due to the fact that the yield is low, and the raw materials are expensive. Accordingly, synthetic DL-methionine has been widely used since this product can be produced at a relatively low cost by synthetic processes. Although synthetic DL-methionine is acceptable as a feed additive for cattle, it is not as advantageous as L-methionine and cannot be used in place of L-methionine in medicine and veterinary application.

SUMMARY OF THE INVENTION

The present invention provides an efficient process for producing L-methionine in high yield by fermentation. It has now been found that certain type mutant strains of coryneform glutamic acid-producing bacteria represented by *Corynebacterium glutamicum* are capable of producing a considerable amount of L-methionine. Investigators may classify such glutamic acid-producing bacteria as either Corynebacterium, Brevibacterium, Arthrobacter or Microbacterium. Coryneform glutamic acid-producing bacteria form a taxonomically closely related group of bacteria as described by Abe et al. in J. General and Applied Microbiology, vol. 13, 279–301 (1967). The L-methionine is accumulated in the culture medium and may easily be removed therefrom. Thus, the present invention provides an economical commercial process for the production of L-methionine.

The organisms found useful in the present invention are certain type mutant strains of coryneform glutamic acid-producing bacteria belonging to the general Brevibacterium, Corynebacterium, Arthrobacter and Microbacterium. All of the genera are found within the class Schizomycetes. Brevibacterium is a genus within the family Brevibacteriaceae, order Eubacteriales and is generally characterized by: short, unbranching rods; generally non-motile; type of motility of motile species is peritrichous or uncertain; sometimes chromogenic, with non-water-soluble reddish, reddish orange, yellow or brown pigments; may or may not reduce nitrates; glucose broth usually becomes acid; lactose not fermented; proteolytic action varies with the species; aerobic and facultatively anaerobic; rarely microaerophilic. Corynebacterium is a genus within the family Corynebacteriaceae, order Eubacteriales, and is generally characterized by: straight to slightly curved rods with irregularly stained segments, sometimes granules; frequently show club-shaped swellings; snapping division produces angular and palisade (picket-fence) arrangements of cells; non-motile with exceptions among the plant pathogens; Gram-positive, but sometimes young cells and sometimes old cells losing the stain easily; granules invariably Gram-positive; generally quite aerobic, but microaerophilic or even anaerobic species occur; catalase-positive; may or may not liquefy gelatin; may or may not produce nitrites from nitrates; may or many not ferment sugars, but seldom, if ever, is a high acidity produced; many species oxidize glucose completely to $CO_2$ and $H_2O$ without producing visible gas. Arthrobacter is a genus within the family Corynebacteriaceae, order Eubacteriales, and is generally characterized by: in young cultures the cells appear as rods which may vary in size and shape from straight to bent, curved, swollen or club-shaped forms; snapping division may show angular cell arrangement; short filament formation with rudimentary budding may occur, especially in richer liquid media; Gram-negative or Gram-variable, coccoid cells are characteristically observed in cultures after one nant form in older cultures and are Gram-negative to Gram-positive; larger coccoid cells which give rise to one or more rod-shaped cells on fresh transfer also occur; generally non-motile; growth on solid media soft or viscous; growth on liquid media generally not profuse; most species liquefy gelatin; little or no acid from carbohydrates; nitrites generally produced from nitrates; indole not produced; aerobic; most species show little or no growth at 37°. Microbacterium is a genus within the family Corynebacteriaceae, order Eubacteriales and is characterized by: small rods with roundel ends; vary in length from 0.5 to 30 microns; non-motile; granulations demonstrable with methylene blue stain; Gram-positive; good surface growth on media supplemented with milk or yeast extract, acid production weak with principally L (+)-lactic acid produced from fermented carbohydrates; catalase-positive optimum temperature, 32° C. The present invention comprehends the finding that mutant strains of coryneform glutamic acid-producing bacteria represented by *Corynebacterium glutamicum* which exhibit resistance to analogues of methionine (for example; α-methylmethionine, ethionine, norleucine, N-acetylnorleucine, S-trifluoromethylhomocysteine, 2-amino-5-heptenoic acids, 2-amino-4-hexenoic acid, seleno-methionine, methionine sulfoximine, methoxinine, 1-aminocyclopentane carboxylic acid, etc.), are also excellent producers of L-methionine. The expression "mutant resistant to analogues of methionine" throughout the present specification means the mutant of which growth is not inhibited by analogues of methionine while that of most strains is inhibited. Such resistance is determined usually by checking if the mutant can grow in a medium containing 500 γ/ml. of an analogue though the concentration varies depending upon the microorganisms and the analogues. The microorganisms used in the present invention are mutant strains of coryneform glutamic acid-producing bacteria represented by *Corynebacterium glutamicum* which exhibit resistance to analogues of methionine. Preferred species thereof is shown in the working example hereinbelow, but it can be generally stated that the following L-glutamic acid-producing microorganisms are preferred in connection with the process of the present invention: *Brevibacterium glutamigenum, Brevibacterium lactofermentum, Brevibacterium saccharolyticum, Brevibacterium thiogenitalis,* Brevibacterium sp., Corynebacterium sp., *Corynebacterium callunae, Corynebacterium acetoacidophilum, Corynebacterium melassecola, Microbacterium flavum* var. *glutamicum*, Arthrobacter sp., a particularly preferred mutant strain of *Corynebacterium glutamicum* has been deposited with the American Type Culture Collection, Rockville, Md., and has been accorded accession number ATCC 21608.

Production of L-methionine in accordance with the present invention is preferaby carried out by fermentation, under aerobic conditions, of aqueous nutrient media such as by shaking culture or submerged culture. It is also preferred to maintain the culturing temperature between 20° and 40° C. and the pH approximately neutral to obtain a high yield. However, the temperature and pH conditions may vary according to the specific microorganisms used.

The culture medium employed in the present invention may be either synthetic or natural, so long as the medium properly contains a carbon source, a nitrogen source, inorganic compounds and small amounts of additional nutrients necessary for the specific microorganism used. Other than the above, there are no special restrictions attached to other essentials of the medium composition. The carbon source may comprise various carbohydrates for example, glucose, fructose, sucrose, maltose, mannose, starch, starch hydrolyzate liquor, molasses, etc. Polyalcohols such as glycerol, etc. and various acids such as pyruvic acid, fumaric acid, lactic acid, acetic acid, etc. may also be used. Furthermore, hydrocarbons and alcohols may be used according to the assimilability of the microorganism used. As the nitrogen source, various substances can be used, for example, ammonia; various kinds of inorganic or organic ammonium salts such as ammonium chloride, ammonium sulfate, ammonium carbonate of ammonium acetate; urea and other nitrogen-containing substances; and nitrogenous organic substances such as peptone, NZ-amine (enzymatic digest of casein), meat extract, yeast extract, corn steep liquor, casein hydrolyzate, fish meal and fish meal digest, defatted soybean cake and its digest, and chrysalis hydrolyzate. An inorganic compounds, dipotassium hydrogen phosphate, potassium dihydrogen phosphate, magnesium sulfate, sodium chloride, ferrous sulfate, manganese sulfate, and calcium carbonate may be used. In cases of strains requiring very small amounts of nutrients such as vitamins, amino acids, bases etc. for growth, these nutrients may be added to the medium.

It is preferred that the microorganism be grown in a seed medium prior to being used for inoculation of the culture medium. The seed medium is incubated under favorable growth conditions for a period of time sufficient to develop a suitable organism population, typically for about 24 hours. The seed medium is then used to inoculate the culture medium. Fermentation is then carried out until a considerable amount of L-methionine is produced and accumulated in the resultant medium, usually 1 to 5 days. After the completion of culturing, the L-methionine is readily recovered from the medium by separating the medium from the cells and subjecting the cell free medium to an ion exchange resin treatment or the like.

Practice of certain specific embodiments of the invention is illustrated by the following representative example.

EXAMPLE 1

In this example, the fermentation is carried out using an L-methionine-producing mutant (ATCC 21608), which is resistant to α-methylmethionine. The mutant strain is obtained from *Corynebacterium glutamicum* (ATCC 13032). The strain is cultured for 24 hours, with shaking, in a seed medium containing 2% glucose, 1% peptone, 1% yeast extract and 0.3% NaCl at 30° C. One ml. of this seed culture broth is inoculated into a 250 ml. Erlenmeyer flask containing 10 ml. of a fermentation medium containing 10% glucose, 0.05% $K_2HPO_4$, 0.05% $KH_2PO_4$, 2% $(NH_4)_2SO_4$, 0.025% $MgSO_4.7H_2O$, 0.001% $FeSO_4.7H_2O$, 0.001% $MnSO_4.4H_2O$, 0.5% NZ-amine, 50 μg./l. of biotin, 2 mg./l. of thiamine hydrochloride and 2% $CaCO_3$ (pH 7.2). Cultivation is carried out at 30° C. for 72 hours with shaking. A concentration of 3.4 mg./ml. of L-methionine is accumulated in the culture liquor. After the removal of microorganism cells and $CaCO_3$ from the liquor, the L-methionine in the liquor is recovered by ion exchange resin treatment. Yield from one l. of the cultured liquor is 1.9 g.

What is claimed is:

1. A process for producing L-methionine by fermentation which comprises culturing a mutant strain having a resistance to methionine analogues, said strain belonging to coryneform glutamic acid-producing bacteria represented by *Corynebacterium glutamicum*, under aerobic conditions in an aqueous nutrient medium, and accumulating L-methionine in the resultant culture liquor.

2. A process according to claim 1, wherein said strain is *Corynebacterium glutamicum* (ATCC 21608).

3. A process according to claim 1, wherein culturing is carried out at a temperature of about 20° to 40° C. and at a pH approximately neutral.

4. A process according to claim 1 wherein said mutant strain is resistant to at least one analogue selected from the group consisting of α-methylmethionine, ethionine, norleucine, N - acetylnorleucine, S - trifluoromethylhomocysteine, 2-amino-5-heptenoic acid, 2-amino-4-hexenoic acid, seleno-methionine, methionine sulfoximine, methoxinine, 1-aminocyclopentane carboxylic acid.

5. A process according to claim 1 wherein said L-methionine is separated and recovered from said culture liquor.

References Cited

UNITED STATES PATENTS 3,219,543  11/1965  Dours et al. _____ 195—28 R
3,139,386   6/1964  Takesue et al. _____ 195—47

ALVIN E. TANENHOLTZ, Primary Examiner

U.S. Cl. X.R.

195—28 R, 47